UNITED STATES PATENT OFFICE.

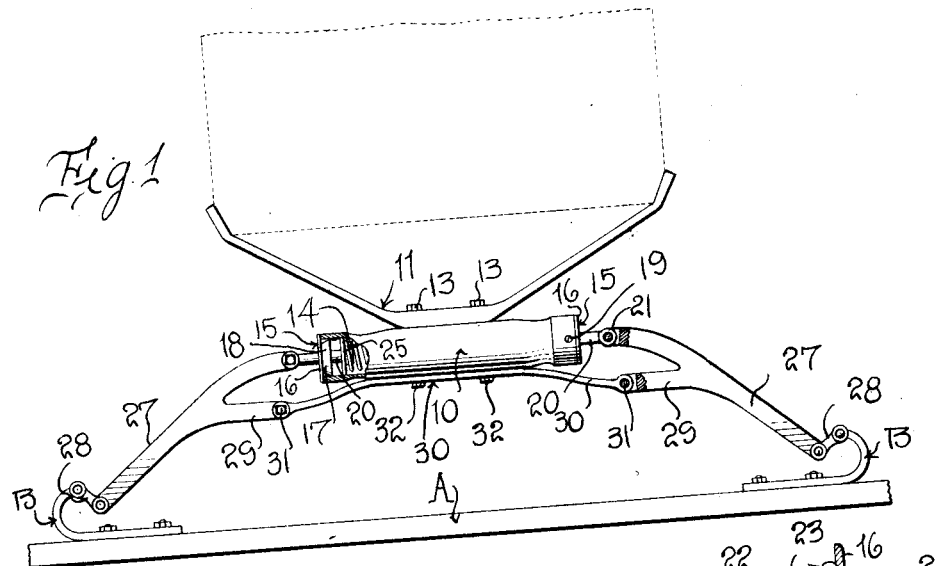
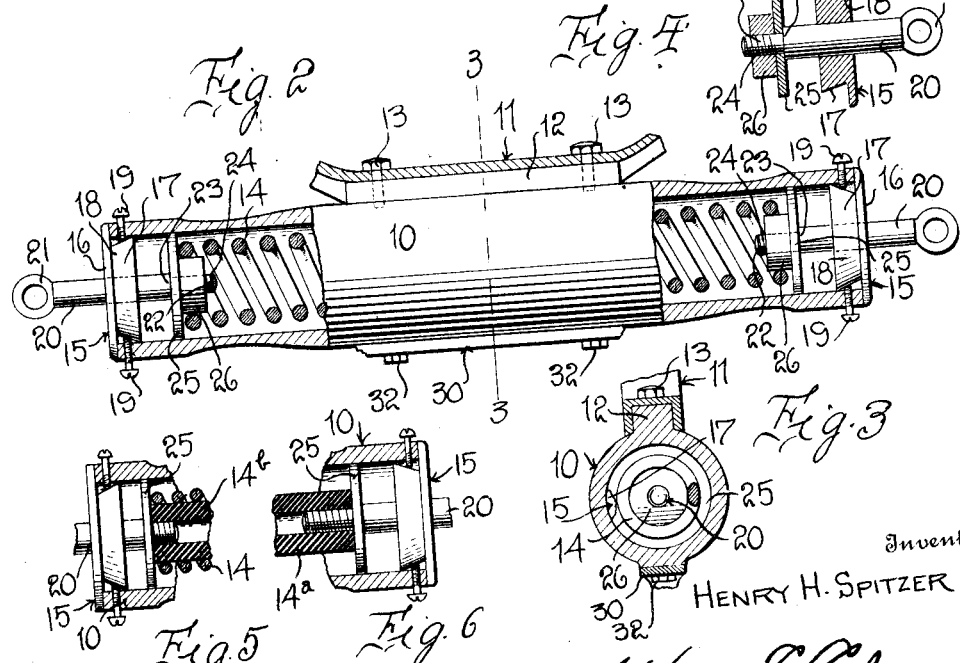

HENRY H. SPITZER, OF CHATTANOOGA, TENNESSEE.

VEHICLE-SPRING.

1,197,776.  Specification of Letters Patent.  Patented Sept. 12, 1916.

Application filed December 20, 1915. Serial No. 67,823.

*To all whom it may concern:*

Be it known that I, HENRY H. SPITZER, a citizen of the United States, residing at Chattanooga, in the county of Hamilton and State of Tennessee, have invented certain new and useful Improvements in Vehicle-Springs, of which the following is a specification, reference being had to the accompanying drawings.

My invention relates to vehicle springs, and particularly to springs adapted for light automobiles wherein single springs are used at the front and rear as in the Ford cars.

The general object of my invention is to provide a spring so constructed that it will offer relatively great resistance to shocks and jars and which will permit relatively small vibrations of the vehicle body but wherein the force of the spring will be used to resist depressions of the vehicle body under a heavy load, and another object is to provide a spring of very simple construction which may be very cheaply made, readily applied to all vehicles and in which the parts may be readily disassembled for repair or replacement.

A further object in this connection is to provide a shock resisting structure for vehicles wherein the depression of the body of the vehicle or the upward movement of the axle relative to the body will cause the equal compression of both ends of a coiled spring.

Other objects will appear in the course of the following description.

My invention is illustrated in the accompanying drawings, wherein:

Figure 1 is an elevation, partly in section, of a vehicle suspension mechanism constructed in accordance with my invention; Fig. 2 is an elevation, partly broken away, of the member 10 and allied parts; Fig. 3 is a section on the line 3—3 of Fig. 2; Fig. 4 is a detailed sectional view of a cylinder head and its corresponding plunger; Fig. 5 is a fragmentary diametric section through one end of the cylinder 10 showing a modified form of resilient compression member; Fig. 6 is a like view to Fig. 5 but showing still another modification.

Referring to these drawings, A designates the axle of the vehicle upon which are mounted the oppositely disposed inwardly and upwardly curved clips B ordinarily found in automobile constructions.

My improved spring or resilient supporting structure comprises a tubular or hollow housing designated 10 which is adapted to contain and house a coiled spring, as will be later stated, and which is adapted to carry upon it a body supporting member or yoke 11. Preferably, the upper face of the housing 10 is formed with a longitudinally extending rib 12 and the body supporting member 11 is U-shaped in cross section to fit over this rib and is held to the rib by means of screw bolts 13. The body supporting member rests at its middle flat against the rib 12 and extends upward and outward from this middle flat portion.

Disposed within the housing 10 and centered therein, as will more fully hereafter appear, is a coiled spring 14. The opposite ends of the housing are provided with heads 15, each head, as illustrated, comprising a body which is turned to provide a flange 16 extending over the end of the tubular housing 10, and bearing against this end, and a portion 17 which extends into the end of the housing. This portion 17 is formed with an outwardly and centrally beveled face 18 for engagement with set screws 19 which extend through the side wall of the housing and which engage this beveled face so that when the set screws are turned up the corresponding head will be forced firmly into engagement with the end of the housing.

The head 15 is centrally bored for the passage of a plunger shank 20 formed at its outer end with an eye 21. The inner end of each plunger shank 20 is reduced as at 22 so as to provide a shoulder 23, this reduced portion 22 being screw threaded as at 24 for a portion of its length. Disposed upon the reduced portion 22 and bearing against the shoulder 23 is a plunger head 25 and engaging with the screw threads 24 is an annular spring guide 26 which also acts as a nut and bears against the plunger head 25 which holds it in place. The spring 14 has an internal diameter equal to the external diameter of the plunger guides and extends over the plunger guides and bears against the plunger heads as illustrated clearly in Fig. 2. It will thus be seen that any inward movement of either or both of the plungers will cause the compression of the spring.

Connected to the eye 21 of each of the plungers 20 is a downwardly and outwardly extending evener bar 27. The upper end of each evener bar is bifurcated to engage the eye 21 of the corresponding plunger rod and the lower end is formed with an eye for engagement with the links 28 which are in turn pivotally engaged with the clips B. From the under side of each evener bar 27 extends an arm 29 which is disposed beneath the upper end of the evener bar, this arm being bifurcated at its extremity, and pivotally connected to these arms 29 is an equalizing bar 30 which bar at its ends is formed to be disposed between the forks or bifurcated ends of the arms 29 and be pivotally connected thereto by means of the bolts 31. The equalizing bar 30 is preferably upwardly bowed slightly and bears against the flat under face of the housing 10, and is attached thereto by two tap bolts 32.

While I have illustrated a coiled spring 14 as disposed within the housing 10 and as the resilient compression member, I wish it understood that other resiliently compressible members might be disposed within the housing against which the plungers can bear. Thus for instance, as shown in Fig. 6, a cylinder of rubber designated 14ª may be disposed within the housing and fit upon the central protuberance of the plunger, the inward movement of the plungers compressing this rubber cylinder and the rubber cylinder thus taking the place of the spring 14. It is also within the province of my invention to use both the spring 14 and a rubber core 14ᵇ in connection therewith so as to increase the resistance of the spring, as in Fig. 5.

In practical use a relative depression of the body supporting member 11 will act to shift the housing 10 downward. This will tend to depress the inner ends of the links or evener bars 27 and this depression will cause the plungers 20 to move toward each other, thus compressing the spring 14 to a greater or less degree. This movement is permitted by the fact that the evener bars are pivotally connected to the plunger rods and also pivotally connected to the equalizing bar 30 so that any downward movement upon the housing 10 will, through the equalizing bar, tend to depress both the evener bars 27 equally. It will also be seen that lateral vibrations of the member 11 will tend to force one or the other of the plungers inward so that these lateral vibrations will also be resisted by the spring 14.

In the actual practice of my invention I find that the spring 14 should be about 9½ or 10 inches long and should be of round spring steel with a space of a quarter of an inch between the coils. The capacity of this spring is about 500 pounds but by placing a rubber core within the center of the spring its capacity may be increased to approximately 750 pounds. With a spring of this construction the plungers have a movement of about one inch without exerting much, if any, compressing force upon the spring, but when the vehicle is heavily loaded the plunger is forced positively into engagement with the ends of the spring and the compression is even and any further downward movement of the spring will compress the spring evenly. On the other hand the spring cannot be forced up as can most springs and thus be broken. This spring may be set on any radius necessary to secure its purpose. The member 11 can be made to suit any desired vehicle or any particular circumstances of operation. Inasmuch as the spring is inclosed within the housing 10 no dirt or water can get at it, and hence the spring will retain its tension, and will retain its elasticity for a considerable period. The spring and its coacting parts weigh in practice about 22 pounds and extra fittings may be carried in a small box on the automobile so that the automobilist can repair this spring in a few minutes at any place. It will be noted that all the parts are readily detachable with relation to each other without the use of a skilled workman.

It is to be understood that by the term "spring" as used in the appended claims I desire to include not only a coiled spring 14 as illustrated in Figs. 1 and 2, but also any resilient member such as the members 14ª and 14ᵇ which will resiliently resist compression.

Having described my invention, what I claim is:

1. In a vehicle spring system, the combination with a compression spring and plungers operating against both ends of the spring, of relatively divergently inclined rigid members each directly pivoted at its inner end to one of the plungers and each pivotally supported at its outer end.

2. In a vehicle spring system, the combination with a compression spring and plungers operating against opposite ends of the spring, of relatively divergently inclined rigid members each directly pivoted at its inner end to one of the plungers and each having an arm pivotally connected to a relatively rigid fulcrum.

3. In a vehicle spring system, the combination with a compression spring and plungers operating against opposite ends of the spring, of relatively divergently inclined rigid members each pivoted at its inner end directly to one of the plungers and each having a rigid relatively divergent arm disposed adjacent the point of the pivotal connection to the plungers, each arm being pivotally connected to a relatively rigid fulcrum.

4. In a vehicle spring system, the combination with a compression spring and plungers operating against opposite ends of the spring, of relatively divergently inclined rigid members each pivoted at its inner end directly to one of the plungers, a member to which the outer ends of the rigid members are swingingly connected, each of said rigid members having a divergent arm pivotally connected to a relatively rigid fulcrum.

5. In a vehicle spring system, the combination with a compression spring and a housing surrounding the spring, of relatively divergently inclined rigid members pivotally connected directly to the plungers, each member having a divergent arm and a rigid member attached to the housing and extending beyond the same to which said arms are pivotally connected.

6. In a vehicle spring system, a compression spring, a housing therefor, a supporting member, plungers disposed within the housings and bearing against opposite ends of the spring, relatively divergently inclined rigid members each pivoted directly to one of said plungers and each extending toward said supporting member and swingingly connected thereto at the ends, and a bar rigidly attached to the housing and extending therebeyond, each of said rigid members having an arm pivoted directly to said bar, and means on the housing for supporting the body of a vehicle.

7. In a vehicle suspension mechanism, the combination with a supporting member, of a compression spring disposed above the supporting member, plungers operating against the ends of said spring, rigid evener bars swingingly connected at their outer ends to the supporting member and extending forward and inward and pivoted directly to the plungers, said evener bars adjacent their upper ends being formed with rigid inwardly projecting arms, a housing surrounding the spring and plungers, an equalizing bar rigidly attached to the housing and pivotally connected at its ends to the arms of the evener bars, and means on the housing for supporting a body.

8. In a vehicle suspension mechanism, the combination with a supporting member, of a compression spring, a cylindrical housing surrounding the compression spring and extending beyond it at each end, heads on the housing, plungers disposed within the housing and having shanks extending out through said heads, downwardly and outwardly extending rigid evener bars pivoted directly at their upper ends to said plungers and at their lower ends swingingly connected to the supporting member, said evener bars adjacent their upper ends being formed with rigid inwardly extending arms, an equalizing bar rigidly attached to the under side of the housing and projecting beyond the same and having its ends pivotally connected to said arms of the evener bar, and a member mounted upon the housing and adapted to support the body.

9. In a vehicle suspension member, the combination with an axle, of a compression spring disposed above the axle, a housing surrounding the compression spring, plungers operating in said housing and bearing both against the ends of the compression spring, clips extending upward and inward from the axle, links pivotally connected to the clips, rigid evener bars pivoted directly to said links and extending upward and inward and pivotally connected at their inner ends to said plungers, the evener bars being formed adjacent their upper ends with rigid inwardly extending arms, and an equalizing bar rigidly connected to the housing and at its ends pivotally connected to the inwardly extending arms of the evener bar.

10. In a vehicle suspension mechanism, the combination with a supporting member, of a compression spring disposed above the supporting member, a housing loosely surrounding the compression spring, heads detachably engaging the ends of the housing, plungers having shanks extending through said heads, the lower ends of the shanks being reduced and screw threaded, plunger heads mounted upon said reduced portions of the shanks, a spring engaging guide engaging the screw threaded portion of the shank and bearing against the plunger heads and entering the ends of said compression spring, rigid evener bars pivoted directly at their upper and inner ends to the plungers and at their outer ends operatively mounted upon the supporting member, an equalizing bar rigidly connected to the housing and extending beyond the ends thereof, said evener bars having rigid arms adjacent their upper ends pivotally connected to the ends of the equalizing bar, the pivotal connections of the arms to the bar being pivoted below the disposed connections of the evener bars to the plungers, and means upon the housing for supporting the vehicle body.

In testimony whereof I hereunto affix my signature in the presence of two witnesses.

HENRY H. SPITZER.

Witnesses:
JAMES CLARK,
H. R. NEWTON.